United States Patent [19]
Farr

[11] Patent Number: 4,966,248
[45] Date of Patent: Oct. 30, 1990

[54] TRACTION CONTROL SYSTEM

[75] Inventor: Glyn P. R. Farr, Warwick, England

[73] Assignee: Lucas Industries public limited company, Birmingham, England

[21] Appl. No.: 231,579

[22] Filed: Aug. 12, 1988

[30] Foreign Application Priority Data

Aug. 14, 1987 [GB] United Kingdom ............... 8719299

[51] Int. Cl.$^5$ ............................................. B60T 8/62
[52] U.S. Cl. ....................... 180/197; 180/244; 303/103; 188/355
[58] Field of Search ............... 180/197, 233, 244, 247, 180/169; 303/114, 93, 111, 110, 113, 119, 116, 61, 62, 63, 100, 99; 188/356, 355, 357, 353, 181; 91/6, 16, 32, 376 R; 60/545, 534

[56] References Cited
U.S. PATENT DOCUMENTS

| | | | |
|---|---|---|---|
| 4,073,359 | 2/1978 | Fujiki et al. | 180/169 |
| 4,778,225 | 10/1988 | Rudolph et al. | 180/197 |
| 4,794,538 | 12/1988 | Cao et al. | 180/197 |
| 4,802,562 | 2/1989 | Kuroyanagi et al. | 180/197 |

Primary Examiner—David M. Mitchell
Assistant Examiner—Richard Camby
Attorney, Agent, or Firm—Scrivener and Clarke

[57] ABSTRACT

A traction control system for the driven wheels of a road vehicle includes a modulation unit which controls fluid flow from a master cylinder actuated via a servo unit to supply fluid under pressure to a spinning driven wheel in order to reduce the degree of spin and increase the torque transmitted to the other driven wheel. The servo unit is actuatable independently and by itself when spin control is required, by way of a solenoid valve which causes a part of the normal output force of the servo to be applied to the master cylinder for the purpose of spin control.

4 Claims, 3 Drawing Sheets

TRACTION CONTROL SYSTEM

The present invention relates to a traction control system for use in controlling the driven wheels of a road vehicle.

In particular, the aim of the present invention is to provide a traction control system in which the brake of a spinning driven wheel can be applied to limit the spin of that wheel to allow torque to be applied through the conventional differential mechanism to the other driven wheel or wheels.

According to the present invention there is provided a traction control system for use in controlling the driven wheels of a road vehicle, comprising a master cylinder connected via a modulation unit to each wheel brake, the modulation unit being arranged to control the fluid pressure applied by the master cylinder to each wheel brake in dependence upon the relative speeds of the vehicle wheels, the fluid pressure produced by the master cylinder being provided by actual pressure on a brake pedal together with supplemental pressure provided by a vacuum servo unit, the vacuum servo unit incorporating an electromagnetic valve which, when de-energized, allows the servo unit to only operate to provide supplemental pressure when pressure is applied to the brake pedal, said electromagnetic valve, when energised, connecting the servo unit to atmosphere so that the servo unit can by itself apply fluid pressure to a wheel brake via the modulation unit, the electromagnetic valve being energised when a wheel commences to spin faster than the other wheels.

In a preferred embodiment of the present invention the vacuum servo unit is formed by a hollow casing within which a piston is axially movable. The piston together with a flexible diaphragm divides the casing into two chambers, one chamber being connected to a vacuum source and the other being connectible by a valve arrangement either to atmosphere or to the interior of a flexible bellows extending across said one chamber between the piston and a passage in the casing wall. The said passage is connectible by said electromagnetic valve either to atmosphere when the valve is energized, or to said one chamber when the valve is de-energized.

The valve arrangement preferably comprises an annular valve closure member carried by an actuator rod located between the brake pedal and the master cylinder. The valve closure member is spring biased against a first valve seat provided on the actuator rod so that when the brake pedal is initially depressed said chambers communicate with each other and the servo unit does not assist braking. Subsequently, with continued axial movement of the actuator rod, the valve closure member engages a further valve seat which is provided on the piston, thus sealing said chambers from each other. As said valve closure member then lifts off said first valve seat, said other chamber is connected to atmosphere causing the piston to move in the casing and assist with braking.

By virtue of the construction of the present invention the servo unit can be operated to slow a spinning driven wheel without the driver having to touch the brake pedal. When a spinning driven wheel is sensed by a suitable sensor, to be spinning, a signal is passed to energise the said electromagentic valve. In this way said other chamber of the servo unit is connected to atmosphere causing the servo unit to alone apply fluid pressure via the modulating unit to the brake of the spinning driven wheel, the other driven wheel or wheels receiving power via the conventional differential units to optimise the production of motive power.

The present invention will now be further described, by way of example, with reference to the accompanying drawings, in which.

Figure 1:
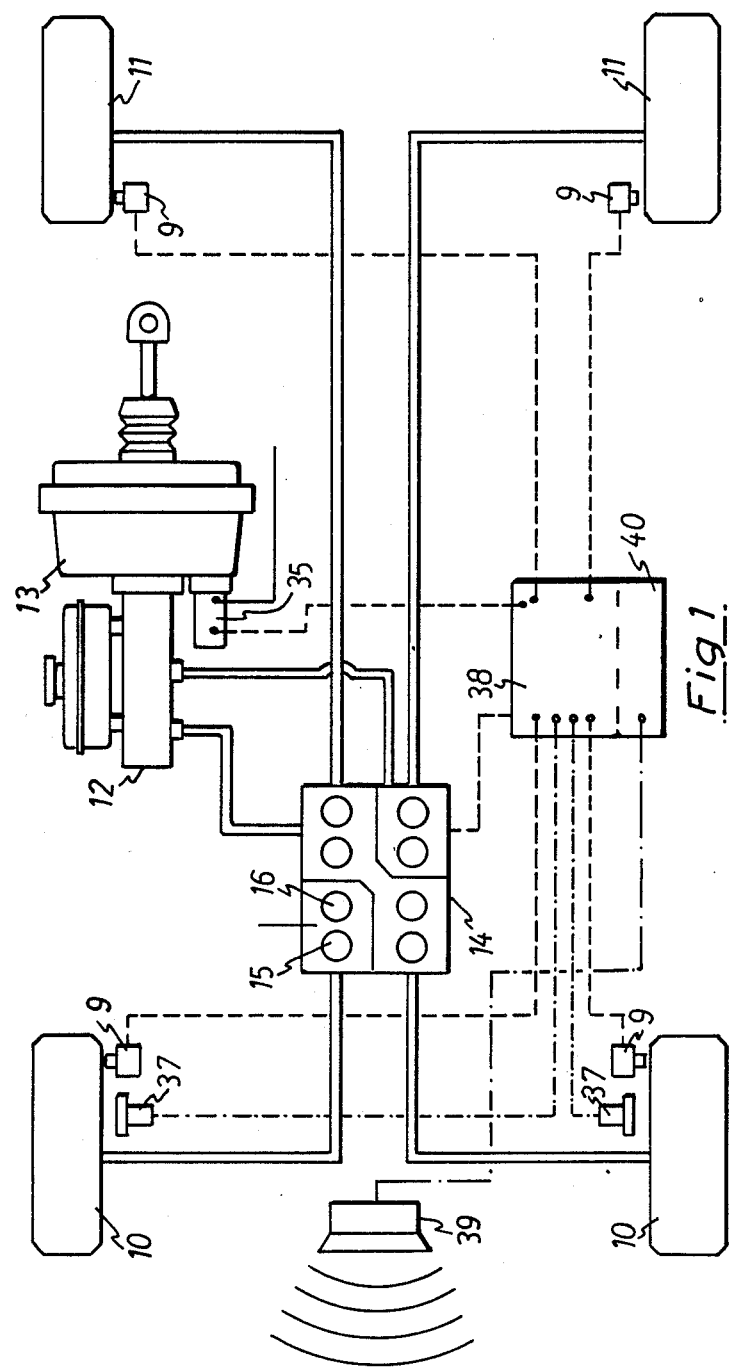
FIG. 1 shows the basic layout of a preferred embodiment of the system of the present invention.

With reference to FIG. 1 there are shown at 10, the driven wheels of a road vehicle, the wheels being driven by the vehicle engine through the usual differential mechanism. The non-driven wheels of the vehicle are indicated at 11 and the brakes of the wheels are connected in the well known diagonal configuration with fluid being supplied by a tandem master cylinder 12 which is operated by a vacuum servo unit 13. The braking system incorporates an anti-skid facility which is provided by a modulation unit 14.

The modulation unit incorporates for each wheel brake a normally open solenoid valve 15 and a normally closed solenoid valve 16. The normally open valve is connected between the master cylinder and the brake and the normally closed valve is connected between the brake and an expansion chamber. When during a normal brake operation locking of a wheel is detected by signals generated by speed sensors 9, the valve 15 is closed and the valve 16 is opened. The effect of this is to close off the connection of the brake of the locking wheel to the master cylinder and to connect the brake to the expansion chamber which absorbs brake fluid and thereby releases the brake. At the same time the fluid which flows into the expansion chamber is pumped back to the master cylinder by a suitable motor driven pump. In order to re-apply the brake after the wheel has accelerated the settings of the valves are reversed but in practice the normally open valve will be pulsed so that the braking force applied to the wheel will increase gradually in order to prevent the wheel locking again.

The operation of the modulation unit can be modified to provide traction control. If one of the driven wheels starts to spin during acceleration of the vehicle then because of the action of the conventional differential the torque available to drive the other driven wheel is reduced and if the one wheel spins freely the vehicle will come to rest. If however the normally open valves 15 of the non-spinning wheels i.e. the other driven wheels 10 and the wheels 11 are closed and fluid under pressure is supplied to the brake of the spinning wheels the degree of spin will be reduced and the torque transmitted to the other driven wheel will increase.

The conventional way of supplying fluid under pressure is to use fluid from a charged accumulator but this is an expensive arrangement since a pump is required to charge the accumulator and the fluid which is introduced into the system has to be extracted from the system.

It is proposed to utilize the master cylinder to provide the fluid under pressure and to arrange for the servo unit 13 to actuate the master cylinder without the need for driver input to the servo and master cylinder.

Figure 2:
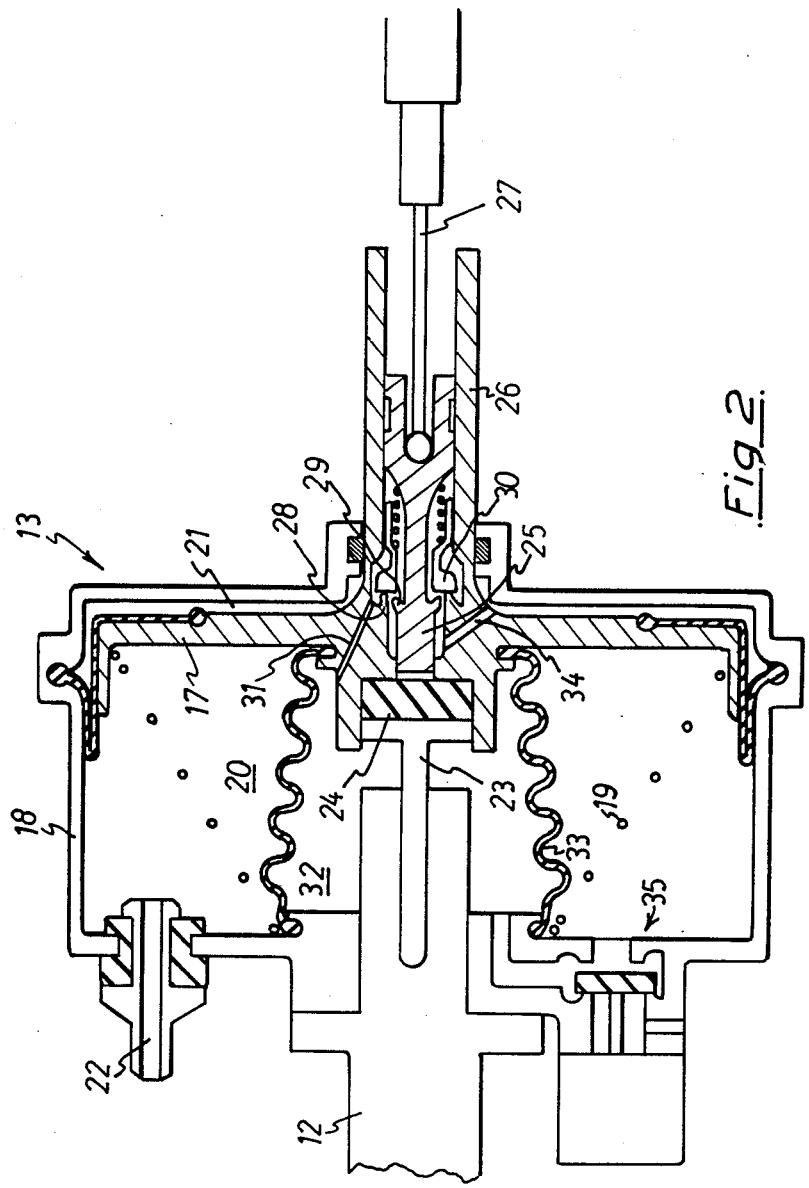
FIG. 2 shows one embodiment of a brake servo unit suitable for use in the present invention.

With reference to FIG. 2 the servo unit is a modified version of a conventional servo unit and it comprises a piston 17 which is movable within a housing 18, the piston and housing carrying the usual rolling diaphragm. The piston is biased by a spring 19 to the brakes off position. The piston and housing define a pair of chambers 20,21, the chamber 20 which houses the spring having a permanent connection 22 to the air inlet manifold of the engine.

The piston is connected to the master cylinder 12 through a push rod 23 having a flanged end which bears against a resilient pad 24 housed within a central recess in the piston and extending from the recess is a bore in which in the example of FIG. 2, is slidable an elongated actuating rod 25. The rod has a further portion which is slidable within a tubular extension 26 coupled to or forming part of the piston. The further portion of the rod is recessed to accommodate an actuating member 27 which is coupled to the brake pedal of the vehicle.

The piston defines a first annular seat 28 which faces towards the tubular extension 26, and the actuating rod 25 defines a second annular seat 29 which also faces towards the extension. For co-operation with these seats there is provided a valve member 30 which is spring biased into contact with the seat 29. A chamber is defined about the outer seat 28 and is connected by way of a passage 31 to a portion 32 of the chamber 20 which lies within a bellows 33. Furthermore, a space is defined about the rod 25, the space being disposed between the seats 28,29 and connected by a passage 34 to the space 21. This space accommodates the spring which biases the valve member 30 and conveniently communicates with the atmosphere by way of grooves formed between the wall of the extension 26 and the part of the rod 25 slidable therein.

The portion 32 of the chamber can be connected to the remaining portion of the chamber 20 through a solenoid operable valve 35 and is so connected when the valve is de-energized. When the valve is energized the portion 32 of the chamber is connected to atmosphere.

Considering first the normal operation of the braking system. Upon depression of the brake pedal the rod 25 and the valve member move in the direction towards the master cylinder and some force will be applied to the master cylinder pistons. However, since the chambers 20 and 21 are in communication with each other via valve 35 and passages 31 and 34, no force will be developed by the servo piston until the valve member 30 seats on the seat 28 to isolate the chambers 20 and 21 following which the seat 29 is lifted away from the valve member to allow air to enter the chamber 21 from the atmosphere. The servo piston will then start to move to contribute in the well known manner to the force applied to the pistons in the master cylinder. When the brake pedal is released the servo piston will return to the position shown.

For the control of traction in the manner described the solenoid valve 35 is energised which allows air to enter the portion 32 of the chamber 20, and also, by way of the passages 31 and 34, the chamber 21. Thus the servo piston is unbalanced and moves against the action of its spring 19 to apply a force to the pistons of the master cylinder. Fluid under pressure is therefore available to actuate the brake associated with the spinning wheel. When the spin has been controlled the valve 35 is de-energized to allow the piston 12 to move to the brake off position. The braking effort applied to the wheel can be controlled in the same manner as with an antilock system with the fluid being returned by the pump to the master cylinder.

Figure 3:
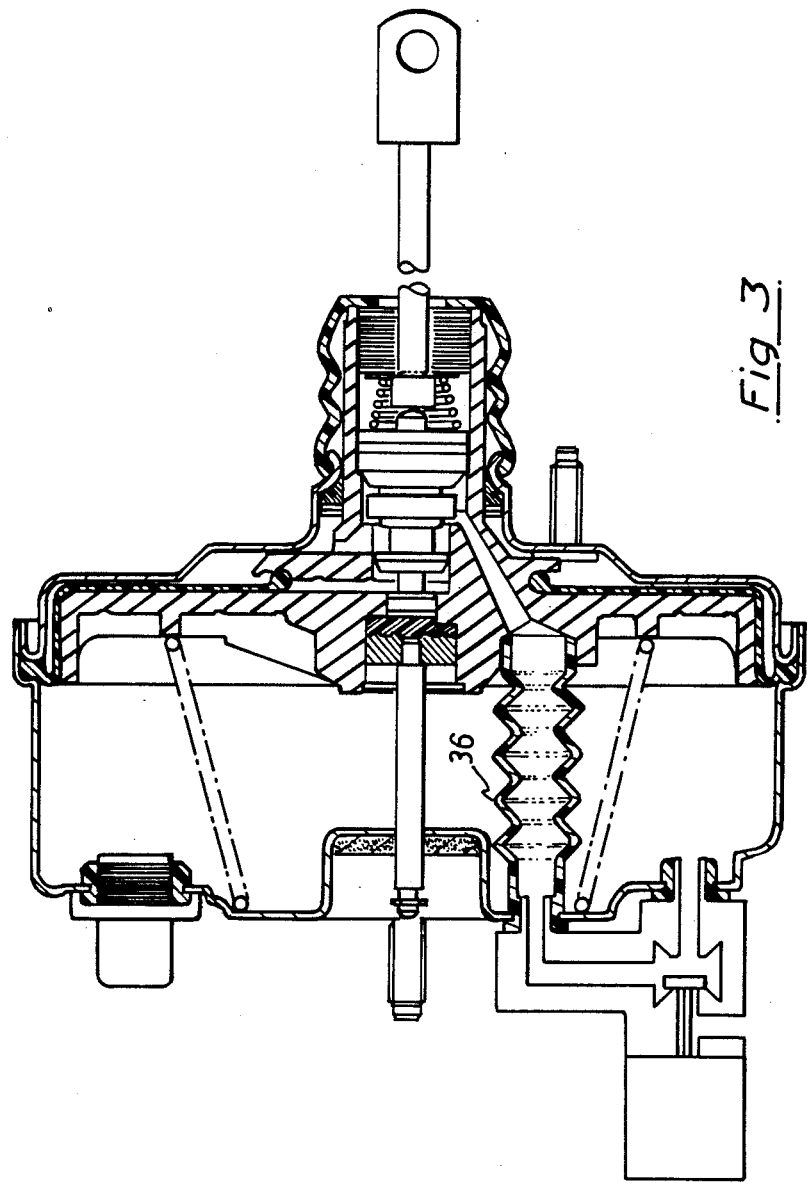
FIG. 3 shows another, more practical, embodiment of a servo unit suitable for use in the present invention.

The force which can be developed by the servo is less than that which can be developed in the normal braking mode in view of the fact that the area of the piston exposed to the vacuum is reduced. Nevertheless, the reduced force which is developed is sufficient for the purpose. The force can be increased by utilizing the construction of FIG. 3 which utilizes a bellows 36 of reduced diameter as compared with the bellows 33.

It will be appreciated that the brake of the spinning driven wheel 10 will become heated and therefore temperature sensors 37 are provided, the signals provided by the sensors are utilized in the controller 38 to de-energise the valve 35 in the event that the brake temperature exceeds a safe value.

Alternatively, the braking effort applied to the wheel can be reduced.

It is anticipated that for conventional cars the system will be rendered inoperative above say 20 kpH. However it can be utilized up to maximum vehicle speeds although in this case in order to limit the brake temperature it may be necessary to control the power developed by the engine.

The system illustrated in FIG. 1 of the accompanying drawings can also be used to provide automatic braking such as required by collosion avoidance systems where radar is used in conjunction with an on-board computer to determine if the vehicle is travelling too fast or too close to the vehicle in front. With this in mind a radar transmitter/receiver unit 39 is located towards the front of the vehicle and connected to an on-board computer 40 which is connected both to the modulator unit 14 and electromagnetic valve 35. In operation the electromagnetic valve 35 would be energized and the valves 15 would be used to control the level of pressure supplied to the vehicle wheels in order to controllably retard the vehicle. Alternatively the electromagnetic valve 35 could be modified such that it could be used to initially actuate the servo booster automatically and then hold the booster in a partially actuated state so that a controlled level of pressure is alone supplied to the brakes, the level of pressure being determined by the computer 40 and being sufficient to produce the required reduction in vehicle speed.

I claim:

1. A traction control system for use in controlling the driven wheels of a road vehicle, comprising a master cylinder connected via a modulation unit to each wheel brake, the modulation unit being arranged to control the fluid pressure applied by the master cylinder to each wheel brake in dependence upon the relative speeds of the vehicle wheels, the fluid pressure produced by the master cylinder being provided by actual pressure on a brake pedal together with supplemental pressure provided by a vacuum servo unit, the vacuum servo unit incorporating an electromagnetic valve which, when de-energized, allows the servo unit to only operate to provide supplemental pressure when pressure is applied to the brake pedal, and, when energized, connects the servo unit to atmosphere so that the servo unit can by itself apply fluid pressure to a wheel brake via the modulation unit, the electromagnetic valve being energised when a wheel commences to spin faster than the other wheels.

2. A traction control system according to claim 1, wherein the vacuum servo unit is formed by a hollow casing within which a piston is axially movable, the piston together with a flexible diaphragm dividing the casing into two chambers, one chamber being connected to a vacuum source and the other chamber being connectible by a valve arrangement either to atmosphere or to the interior of a flexible bellows extending across said one chamber between the piston and a passage in the casing wall, said passage being connectible with atmosphere or said one chamber by said electromagnetic valve.

3. A traction system according to claim 2, wherein the valve arrangement comprises a valve closure member carried by an actuator rod located between the brake pedal and master cylinder, the valve closure member being spring biassed against a first valve seat provided on the actuator rod so that when the brake pedal is initially depressed said chambers communicate with one another, the valve closure member subsequently engaging a further valve seat as the actuator rod is moved axially, to thus seal said chambers one from the other, said other chamber being connected to atmosphere as said valve seat and said valve closure member separate.

4. A traction control unit according to claim 1, wherein a radar transmitter/receiver unit is connected to an on-board computer which controls the modulation unit and the electromagnetic valve, to thus provide a collosion avoidance facility.

* * * * *

REEXAMINATION CERTIFICATE (2955th)
United States Patent [19]
Farr

[11] B1 4,966,248
[45] Certificate Issued Jul. 16, 1996

[54] TRACTION CONTROL SYSTEM

[75] Inventor: Glyn P. R. Farr, Warwick, England

[73] Assignee: Lucas Industries public limited company, Birmingham, England

Reexamination Request:
No. 90/003,894, Jul. 7, 1995

Reexamination Certificate for:
Patent No.: 4,966,248
Issued: Oct. 30, 1990
Appl. No.: 231,579
Filed: Aug. 12, 1988

[51] Int. Cl.⁶ .................................................. B60T 8/62
[52] U.S. Cl. ........................... 180/197; 180/244; 303/103; 188/355
[58] Field of Search ........................ 180/197, 233, 180/244, 247, 169; 60/534, 545; 91/6, 16, 32, 376 R; 188/355, 356, 357, 353; 303/93, 99, 114, 111, 110, 113, 119, 116, 61–63, 100

[56] References Cited

U.S. PATENT DOCUMENTS

| | | |
|---|---|---|
| 3,364,818 | 1/1968 | Hager et al. . |
| 3,856,105 | 12/1974 | Lewis et al. . |
| 3,898,913 | 8/1975 | Hendrickson et al. . |
| 4,206,950 | 6/1980 | Elliott . |
| 4,254,623 | 3/1981 | Dauvergne . |
| 4,260,199 | 4/1981 | Reinecke . |
| 4,589,511 | 5/1986 | Leiber . |
| 4,630,706 | 12/1986 | Takayama et al. . |
| 4,632,208 | 12/1986 | Takayama et al. . |
| 4,660,691 | 4/1987 | Messersmith et al. . |
| 4,667,471 | 5/1987 | Fulmer et al. . |
| 4,681,196 | 7/1987 | Fulmer et al. . |

FOREIGN PATENT DOCUMENTS

| | | |
|---|---|---|
| 0171585A2 | 2/1986 | European Pat. Off. . |
| 0267018 | 5/1988 | European Pat. Off. . |
| 0371015B1 | 6/1990 | European Pat. Off. . |
| 2535662B1 | 5/1984 | France . |
| 2334904 | 1/1975 | Germany . |
| 2334904A1 | 1/1975 | Germany . |
| 3137287C2 | 1/1984 | Germany . |
| 59-14652 | 8/1984 | Japan . |
| 2136899 | 9/1984 | United Kingdom . |
| 2168771 | 6/1986 | United Kingdom . |
| 2194008 | 2/1988 | United Kingdom . |
| WO-A-8604309 | 7/1986 | WIPO . |

OTHER PUBLICATIONS

Opposition by Allied Signal Europe Services Techniques and Patentee's Observations in Reply.
Opposition by ITT Automotive Europe GmbH and Patentee's Observations in Reply.

*Primary Examiner*—Richard M. Camby

[57] ABSTRACT

A traction control system for the driven wheels of a road vehicle includes a modulation unit which controls fluid flow from a master cylinder actuated via a servo unit to supply fluid under pressure to a spinning driven wheel in order to reduce the degree of spin and increase the torque transmitted to the other driven wheel. The servo unit is actuatable independently and by itself when spin control is required, by way of a solenoid valve which causes a part of the normal output force of the servo to be applied to the master cylinder for the purpose of spin control.

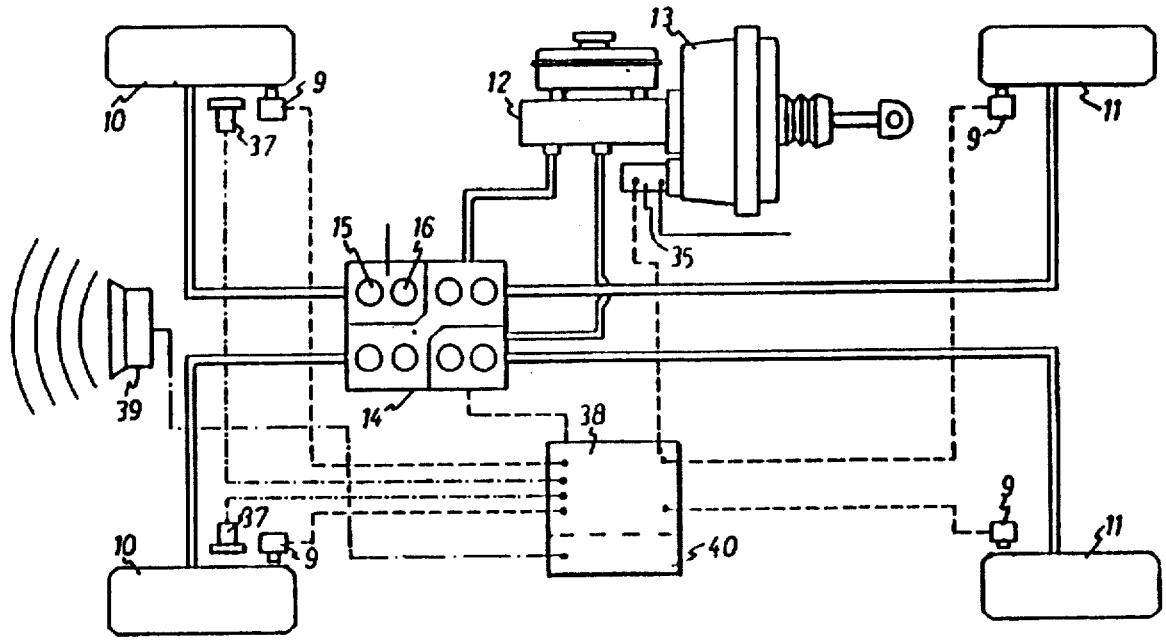

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-4 is confirmed.

* * * * *